Patented Feb. 5, 1952

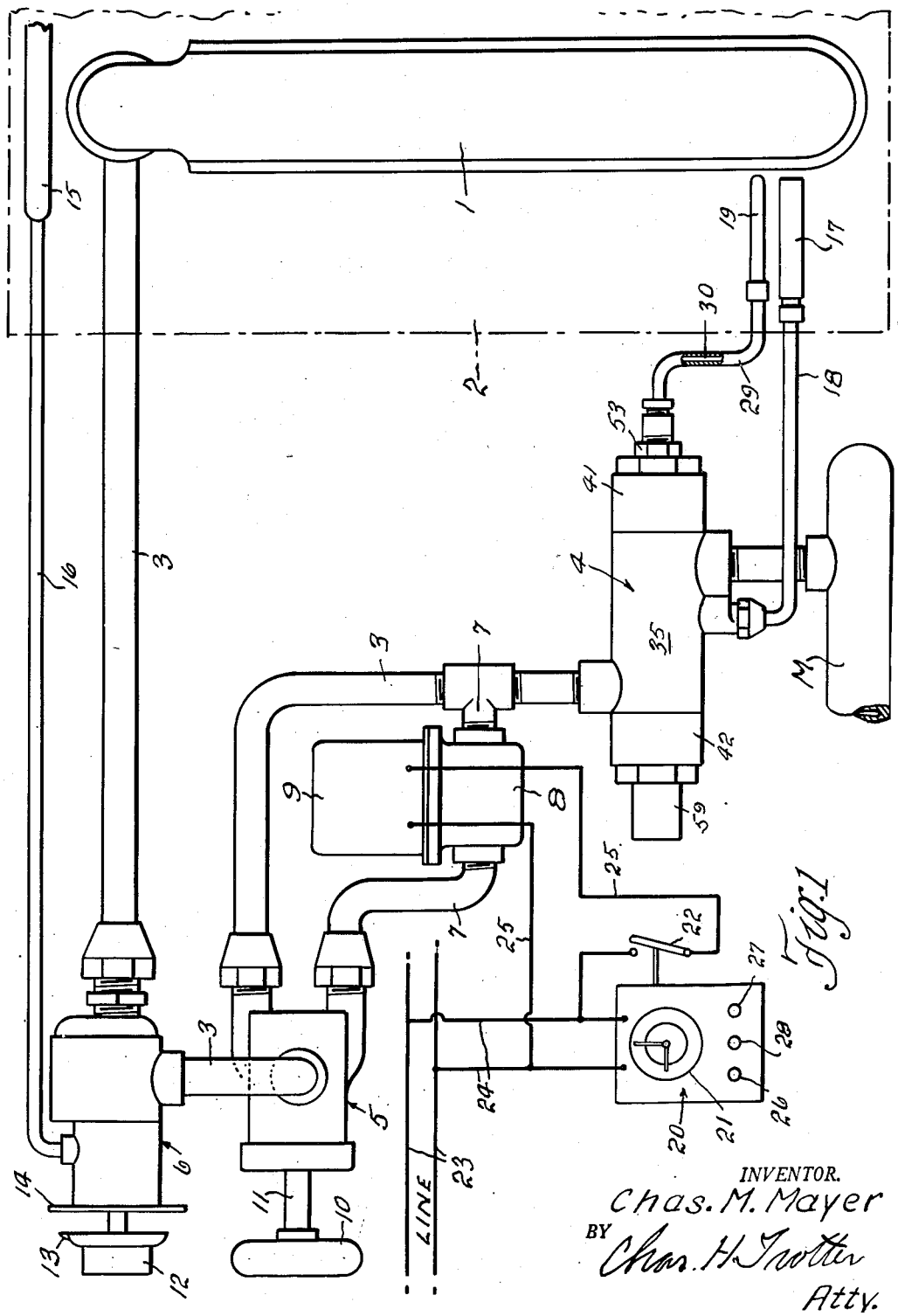

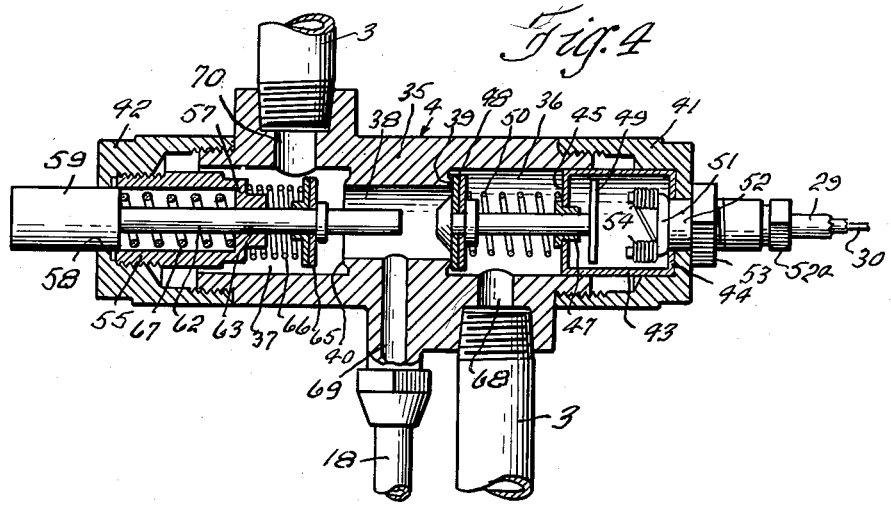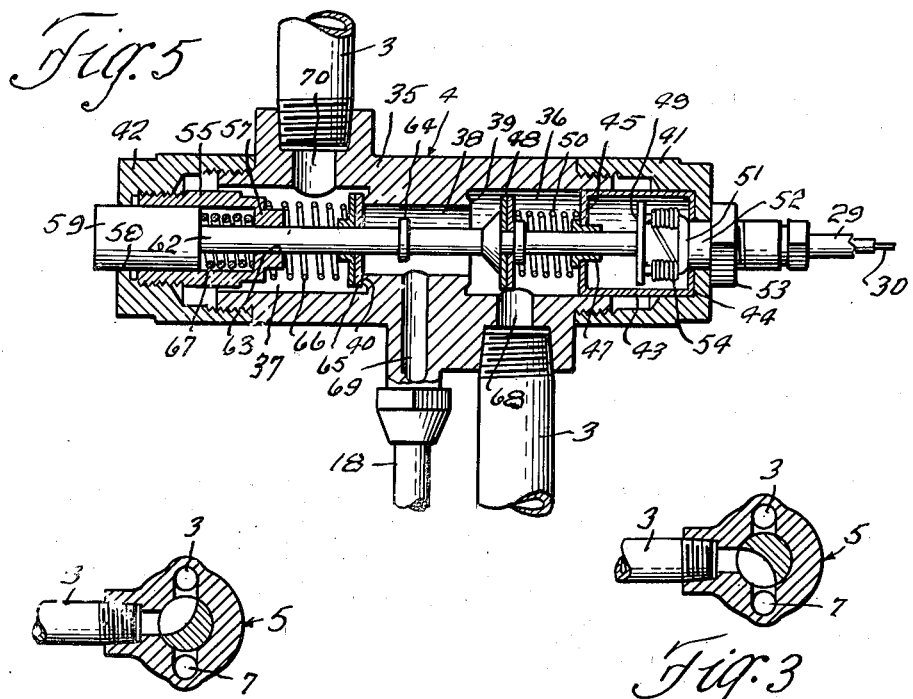

2,584,147

UNITED STATES PATENT OFFICE 2,584,147

OVEN BURNER CONTROL MECHANISM

Charles M. Mayer, Mansfield, Ohio, assignor to
The Tappan Stove Company, Mansfield, Ohio,
a corporation of Ohio Substituted for abandoned application Serial No.
61,107, November 19, 1948. This application
December 11, 1950, Serial No. 200,203

7 Claims. (Cl. 161—9)

This invention relates to a mechanism for automatically controlling the operation of a cooking range oven having a burner using gaseous fuel. The mechanism includes safety control means by which unburned gas is prevented from collecting in an oven, oven temperature control means by which a desired temperature is automatically maintained in an oven, and electrically operated time control means by which an oven burner is automatically turned on at a predetermined set time and is automatically turned off after it has operated a predetermined length of time, all of which have been combined together in a novel manner to provide an improved oven control mechanism by which every phase of oven operation is controlled in conjunction with each other. The mechanism may be set for either mannual operation or for automatic operation. In manual operation the oven burner is manually turned on and off as desired, and in automatic operation the oven burner is automatically turned on and off at predetermined set times. In both manual and automatic operation the safety control means and the oven temperature control means operate automatically to perform their respective functions.

This application is a substitute for my application Serial No. 61,107, filed November 19, 1948, and now abandoned.

Automatic control mechanisms of this general type are well known and work satisfactorily as long as there is no current failure during operation, but in the event of a temporary current failure during operation some prior types cause over cooking or burning of food in an oven, and other prior types cause under cooking.

The principal object of the invention is to provide a very simple and efficient electrically operated time control mechanism for a cooking range oven which is so constructed and arranged that food in an oven will be cooked the set length of time regardless of temporary current failures during operation.

Another object of the invention is to provide an oven control mechanism which may be set for either manual or automatic operation.

Another object of the invention is to provide in a control mechanism of this character means whereby unburned gas cannot collect in an oven.

Other and more limited objects of the invention will be apparent from the following specification and the accompanying drawings forming a part thereof wherein:

Fig. 1 is a diagrammatic view illustrating my improved oven control mechanism;

Fig. 2 is a sectional view through the main control valve showing it in position to direct fuel straight through the conduit;

Fig. 3 is a view similar to Fig. 2 showing the main control valve set to direct fuel through the by-pass;

Fig. 4 is an enlarged central longitudinal vertical section through the safety control valve mechanism showing the various parts thereof in the position they will automatically assume if the pilot burner becomes extinguished; and Fig. 5 is a view similar to Fig. 4 showing the various parts in the position they are manually held in while re-lighting the pilot burner.

Referring now to the drawings by reference characters, the numeral 1 indicates a gaseous fuel burner which is mounted in position to heat a cooking range oven 2. Gaseous fuel is supplied to the burner 1 from a manifold M through a conduit 3. Interposed in the conduit 3 between the manifold M and the burner 1 are a safety control valve generally indicated by the numeral 4, a manually operable main control valve 5 and an oven temperature control valve 6. A by-pass 7 is provided in the conduit 3 between the safety control valve 4 and the main control valve 5. A normally closed valve 8 which is adapted to be opened by a solenoid 9 is interposed in the by-pass conduit 7. The main control valve 5 is a standard cut-off valve having two open or on positions and a closed or off position. In one open position it permits the flow of gas through the by-pass 7 and cuts off the flow of gas through the by-passed portion of the conduit 3, and in the other open position it cuts off the flow of gas through the by-pass 7 and permits gas to flow through the conduit 3. In the closed position it completely cuts off all flow of gas from the manifold M to the burner 1. The valve 5 is manually set to the desired position by a handle 10 and valve stem 11, and it directly controls the operation of the entire apparatus in that it initiates operation when turned to one of the on positions and terminates operation when turned to the closed position. In operation gas flows from the manifold M through the safety control valve 4, then through the main control valve 5 and then through the oven temperature control valve 6 to the burner 1. The oven temperature control valve 6 is operative to regulate the amount of gas flowing to the burner 1 in order to maintain the oven at any desired set temperature. The valve 6 is set to any desired temperature by a handle 12 having a pointer 13 which cooperates with a graduated dial 14 carried by the valve 6. The valve 6 is controlled according to the temperature setting by a thermostatic element 15 mounted in the oven 2 and connected to the valve 6 as shown at 16. The oven temperature control valve 6 is of standard well known construction. Consequently it is not shown in detail herein. There are many different makes available any one of which will work equally well herein. Gas is also supplied to a constantly burning pilot burner 17 through a small branch conduit 18 which extends between the safety control valve 4 and the pilot burner 17. The pilot burner is mounted adjacent one end of the main burner 1 in position to ignite the main burner 1 when gas is supplied thereto. A thermocouple 19 is mounted adjacent the pilot burner 17 in position to be heated thereby. The thermocouple 19 when heated is operative to maintain the safety control valve mechanism 4 in condition to permit the flow of gas to the main burner 1 and the pilot burner 17. If the pilot burner 17 should be extinguished for any reason the thermocouple will immediately cool which will cause the safety control valve mechanism to automatically cut off the supply of gas to both the main burner and the pilot burner. The safety control valve mechanism 4 must then be manually reset and held and the pilot burner manually re-ignited. After the thermocouple has been reheated by the pilot burner the safety control valve mechanism may be released, as the thermocouple will then maintain it in set position. This will be explained in more detail hereinafter in connection with the description of the construction of the safety control valve mechanism.

The by-pass 7, the normally closed valve 8 interposed therein, and the solenoid 9 are provided to adapt the mechanism for automatic operation. The solenoid 9 when energized will open the valve 8 and maintain it open as long as the solenoid is energized. When the solenoid is de-energized the valve 8 will automatically close. The energization of the solenoid 9 is controlled by an electrically operated time control mechanism generally indicated by the numeral 20. The time control mechanism 20 is of standard construction and comprises a self-starting electric clock 21, a switch 22 and mechanism responsive to the clock 21 and operative to close the switch 22 at a predetermined set time and to reopen the switch 22 after the burner 1 has operated a predetermined length of time. Operating current is constantly supplied to the clock 21 from the line 23 through the leads 24. The solenoid 9 and the switch 22 are disposed in series in a circuit 25. The closing of the switch 22 will energize the solenoid 9 and the subsequent opening of the switch 22 will deenergize the solenoid 9. The time control mechanism is set as desired by the buttons 26, 27 and 28. The button 26 is provided to set the time at which it is desired to terminate operation of the burner 1; the button 27 is provided to set the length of time it is desired to have the burner 1 operate and the button 28 is provided to set the time control mechanism in operative condition. After each automatic operation the time control mechanism automatically returns to its normal inoperative condition and must be reset for each subsequent automatic operation of the burner 1.

For manual operation of the burner 1 the main control valve 5 is manually turned from the off position to the position shown in Fig. 2. Gas will then flow from the manifold M through the conduit 3 and into the safety control valve mechanism 4. From the safety control valve mechanism the gas will flow through the conduit 3 around the by-pass 7 and then through the main control valve 5 and the oven temperature control valve 6 to the burner 1 where it is ignited by the constantly burning pilot burner 17. The main burner will then continue to operate until the main control valve 5 is manually turned to the off position which cuts off the flow of gas to the main burner 1 and terminates operation thereof.

When it is desired to control automatically the operation of the burner 1, the time control mechanism is set as desired by the buttons 26, 27 and 28, and the main control valve 5 is set in the position shown in Fig. 3. In this setting of the valve 5 the gas must flow from the safety control valve mechanism through the by-pass 7 to the main control valve 5. The normally closed valve 8 then controls the flow of gas to the burner 1. At the set time the time control mechanism will close the switch 22 which will energize the solenoid 9 and open the normally closed valve 8. Gas will then flow from the manifold M through the conduit 3 to the safety control valve mechanism 4. From the safety control valve mechanism the gas will flow through the by-pass 7 and the valve 8 interposed therein to the main control valve 5. From the main control valve 5 the gas flows through the oven temperature control valve 6 to the burner 1 where it is ignited by the constantly burning pilot burner 17. After the burner 1 has operated the set length of time the time control mechanism will open the switch 22 which will de-energize the solenoid 9. The valve 8 will then automatically close and cut off the supply of gas to the burner 1, thus terminating operation thereof. The main control valve can then be manually turned to closed position at any time.

As an example of the automatic operation of the burner 1, let us assume that it is desired to operate the burner 1 for three hours and to terminate operation thereof at six o'clock. The time control mechanism is then set by the button 26 to terminate operation of the burner 1 at six o'clock according to the electrically operated clock 21, and it is set to operate for three hours by the button 27. The time control mechanism is then set in operative condition by the button 28 and the main control valve 5 is turned to the position shown in Fig. 3. Then three hours before six o'clock by the clock 21 the time control mechanism will close the switch 21 which will, through the solenoid 9 and valve 8, initiate operation of the burner 1. At six o'clock by the clock 21 the time control mechanism will open the switch 22 and terminate operation of the burner 1. Now let us assume that with the time control 20 set as above, there is a temporary current failure of half an hour after the burner 1 has been operating one hour. That would be at four o'clock by the clock 21. The current failure will stop the clock 21 and de-energize the solenoid 9. The valve 8 will then close and cut off the supply of fuel to the burner 1, thus stopping its operation. After half an hour the current comes back on which re-energizes the solenoid 9, since the switch 22 is still closed, and starts the clock 21 operating again. The re-energization of the solenoid 9 opens the valve 8 which starts the burner 1 operating again. Then two hours later, at six o'clock by the clock 21, the time control mechanism will open the switch 22 and terminate operation of the burner 1. From this it will be seen that the burner 1 operated just three hours, the set time, even though due to the half hour current failure the elapsed time from the beginning of the operation of the burner 1 until the final termination thereof was three and one-half hours.

If the pilot burner 17 is extinguished for any reason while the main control valve 5 is still open to supply gas to the main burner a very dangerous situation could arise. Let us assume that both the pilot burner and the main burner are extinguished during operation for some reason. Gas can then flow to the main burner but since the pilot burner is extinguished the main burner will not be ignited and unburned gas will accumulate in the oven which may violently explode when an attempt is made to ignite either the main or pilot burner. This is likewise true if gas to the main burner is cut off by the main control valve when the oven is not in use and the constantly burning pilot burner becomes extinguished for any reason. It has been found by experience that both the pilot burner and the main burner are frequently extinguished during use while the main control valve is open to supply gas to the main burner. It has also been found that the constantly burning pilot burner is frequently extinguished for some reason while the oven is not in use and the supply of gas to the main burner is cut off. This is sometimes due to a momentary failure of the gas supply or the slamming of the oven door or to various other causes.

In order to prevent any accumulation of unburned gas and thus eliminate any danger of an explosion therefrom in the event the pilot burner is extinguished for any reason, I provide the safety control valve mechanism 4 by which the supply of gas to both the main burner and the pilot burner is completely cut off, independently of the main control valve, in the event the pilot burner is extinguished for any reason.

The construction of the safety control valve mechanism 4 will now be described, reference being had to Figs. 4 and 5 of the drawing. This mechanism comprises a casing 35 having a chamber 36 in one end thereof and a chamber 37 in the other end thereof. The chambers 36 and 37 are connected by a bore 38 of reduced diameter. A valve seat 39 is located at one end of the bore 38 and a similar valve seat 40 is located at the other end of the bore 38. The chamber 36 is closed by a removable cap 41 and the chamber 37 is closed by a removable cap 42. A sleeve 43, having end walls 44 and 45, is carried by the cap 41 and extends into the chamber 36. A valve stem 46 which is slidably mounted in a bushing 47 carried by the end wall 45 of the sleeve 43, extends from the chamber 36 into the sleeve 43. A valve disc 48 of suitable material is secured to one end of the valve stem 46 within the chamber 36, and a metal disc 49 is secured to the other end of the stem 46 within the sleeve 43. A spring 50, disposed about the valve stem 46 between the valve disc 48 and the end wall 45 of the sleeve 43, normally holds the valve disc 48 against the valve seat 39. An electromagnet 51 is secured to one end of a hollow exteriorly threaded stud 52 which extends out through aligned apertures in the end wall 44 of the sleeve 43, and in the end of the cap 41. A nut 53 screwed onto the outer portion of the stud 52 securely holds the magnet 51 and the sleeve 43 in place. The legs of the magnet 51 have a winding 54 thereon one end of which is connected to the tube 29 extending between the thermocouple 19 and the safety control mechanism 4, and the other end of which is connected to the wire 30 in the tube 29. The tube 29 is inserted into the hollow stud 52 and is held in place by a screw fitting 55. A sleeve 55 is screwed into a threaded recess in the end of the cap 42, as indicated at 56, and extends into the chamber 37 a slight distance. One end of the sleeve 55 is closed by an end wall 57, and the other end which is open registers with a circular aperture 58 in the end wall of the cap 42. A plug 59 is slidably mounted in the sleeve 55 and extends out through the aperture 58 in the cap 42. A stem 62 which is secured to the inner end of the plug 59 extends out through an aperture 63, in the end wall 57 of the sleeve 55, and through the chamber 37 and into the bore 38. The stem 62 has a collar 64 rigidly secured thereon between the end wall 57 and the outer end of the stem. A valve disc 65 of suitable material is slidably mounted upon the stem 62 between the end wall 57 of the sleeve 55 and the collar 64. The valve disc 65 is adapted to engage the valve seat 40 to cut off the flow of gas into the chamber 37 during the initiation of operation, as will be apparent later herein. A compression spring 66 disposed about the stem 62 between the end wall 57 and the valve disc 65 normally yieldingly holds the valve disc 65 against the collar 64. A compression spring 67 which is stronger than the spring 66 is disposed about the stem 62 within the sleeve 55 between the inner face of the end wall 57 and the inner end of the plug 59. The spring 67 is operative to return the plug 59, stem 62 and valve disc 65 from the position shown in Fig. 5 back to their normal position as shown in Fig. 4, against the resistance of the spring 66. A port 68 in the casing 35 provides communication between the chamber 36 and the conduit 3 to allow gas to flow from the manifold M into the chamber 36. During operation of the main burner 1, gas flows from the chamber 36 through the reduced intermediate bore 38 and into the chamber 37. A port 69 which establishes communication between the conduit 18 and the bore 38 is provided to supply gas to the pilot burner 17; and a port 70 establishes communication between the chamber 37 and the conduit 3 to permit the flow of gas from the chamber 37 to the main burner 1 through the main control valve 5 and the oven temperature control valve 6.

As long as the pilot burner 17 is ignited it projects a flame against and heats the thermocouple 19. The heating of the thermocouple 19 generates a minute current which energizes the magnet 51 sufficiently for it to hold the metal disc and the stem 46 and valve disc 48 secured thereto in the position shown in Fig. 5 against the pressure of the spring 50 after the disc 49 has been manually moved into engagement with the magnet 51. But the magnet 51 when energized by the thermocouple 19 is not strong enough to attract and withdraw the metal disc 49, and the stem 46 and valve disc 48 secured thereto, from the position shown in Fig. 4 to the position shown in Fig. 5. It can only hold these parts in this position after they have been manually moved thereto by depressing the plunger 59.

As soon as the plunger 59 is released the spring 67 will return the plunger 59, stem 62 and valve disc 65 back from the position shown in Fig. 5 to the position shown in Fig. 4 against the pressure of the spring 66. The valve disc 48 will be held in the position shown in Fig. 5 by the magnet 51. Communication is then established between the chambers 36 and 37 through the bore 38. Gas will then flow from the chamber 36 into the chamber 37 through the bore 38. From the chamber 37 gas will flow through the main control valve 5 and the oven temperature control valve 6 and conduit 3 to the main burner 1 where it will be ignited by the pilot burner 17.

In the event the pilot burner 17 is extinguished for any reason during operation the thermocouple 19 will cool in a few seconds and de-energize the magnet 51. The de-energizing of the magnet 51 will allow the spring 50 to move the valve disc 48 back into engagement with the valve seat 39, as shown in Fig. 4, which will cut off the flow of gas from the chamber 36 into the bore 38 and chamber 37, and from them to the pilot burner 17 and the main burner 1. The burner 1 will then be extinguished along with the pilot burner. In order to reset the safety control valve mechanism 4 after the pilot burner 17 has been extinguished, it is necessary only to hold a match to the pilot burner 16 and manually move the plunger 59 from the position shown in Fig. 4 to the position shown in Fig. 5, and hold it in this position a sufficient time for the thermocouple 19 to become heated, after which the plunger 59 may be released and allowed to return to its initial position by the spring 67. The mechanism will then remain in this position as long as the pilot burner 17 is ignited.

From the foregoing it will be apparent to those skilled in this art that I have provided a very simple and efficient mechanism for accomplishing the objects of my invention.

It is to be understood that I am not limited to the specific construction shown and described as various modifications can be made therein within the scope of the appended claims.

What is claimed is:

1. In a control mechanism for automatically controlling the operation of a gaseous fuel oven burner, the combination of a fuel supply manifold, a fuel conduit extending between said manifold and said burner, a by-pass around a portion of said conduit, a manually operable valve by which the supply of fuel to said burner is cut on and off, said valve being located at a junction of said by-pass and said conduit and having one closed position and two open positions and operative when in one open position to direct fuel straight through said conduit to said burner and when in the other open position to direct fuel through said by-pass to said burner and when in closed position to completely shut off the flow of fuel to said burner, a normally closed valve in said by-pass, a solenoid operative when energized to maintain said normally closed valve open, switching means by which the energization of said solenoid is controlled, and a time control mechanism operative to open and close said switching means at predetermined set times.

2. A control mechanism as defined in claim 1 in which a constantly burning pilot burner is provided to ignite said oven burner when fuel is supplied thereto.

3. A control mechanism as defined in claim 2 in which a safety control valve mechanism which is responsive to said pilot burner is interposed in said conduit between said manifold and said by-pass and is operative to cut off the flow of fuel from said manifold upon the extinguishment of said pilot burner.

4. A control mechanism as defined in claim 3 in which an oven temperature control valve mechanism is interposed in said conduit between said by-pass and said oven burner.

5. A control mechanism as defined in claim 1 in which an oven temperature control valve mechanism is interposed in said conduit between said by-pass and said oven burner.

6. A control mechanism as defined in claim 1 in which a pilot burner is provided to ignite said oven burner when fuel is supplied thereto.

7. A control mechanism as defined in claim 6 in which a safety control valve mechanism which is responsive to said pilot burner is interposed in said conduit and is operative to cut off the flow of fuel from said manifold upon the extinguishment of said pilot burner.

CHARLES M. MAYER.

REFERENCES CITED

The following references are of record in the file of this patent:

UNITED STATES PATENTS

| Number | Name | Date |
|---|---|---|
| 2,055,384 | Meacham | Sept. 22, 1936 |